United States Patent [19]

Sorensen et al.

[11] 4,167,691
[45] Sep. 11, 1979

[54] CONTROL ARRANGEMENT FOR A BRUSHLESS MOTOR

[75] Inventors: Frode Sorensen, Sonderborg; Hans K. Pedersen, Nordborg; Hyldal Jorgen, Nordborg; Benny Strandtoft, Nordborg, all of Denmark

[73] Assignee: Danfoss A/S, Nordborg, Denmark

[21] Appl. No.: 870,992

[22] Filed: Jan. 20, 1978

[30] Foreign Application Priority Data

Jan. 20, 1977 [DE] Fed. Rep. of Germany ....... 2702190

[51] Int. Cl.$^2$ ........................................... H02K 29/00
[52] U.S. Cl. ................................. 318/138; 318/254 R
[58] Field of Search ............................... 318/138, 254

[56] References Cited

U.S. PATENT DOCUMENTS

| 3,585,474 | 6/1971 | Kobayashi et al. | 318/138 |
| 3,599,050 | 8/1971 | Komatsu | 318/138 |
| 3,735,216 | 5/1973 | Vemura | 318/138 |
| 4,004,202 | 1/1977 | Davis | 318/138 |
| 4,008,422 | 2/1977 | Sodekoda et al. | 318/138 |
| 4,065,706 | 12/1977 | Gosling et al. | 318/138 X |

*Primary Examiner*—Gene Z. Rubinson
*Attorney, Agent, or Firm*—Wayne B. Easton

[57] ABSTRACT

The invention relates to a control circuit for a brushless self-starting D.C. motor of the type having a permanent magnet rotor and stator coils, a magnetic field-dependent component or sensing coil for sensing the position of the rotor, and controllable electronic switches in respective series with the stator coils and the D.C. source. The switches control current through the stator coils in dependence on the rotary position of the rotor pursuant to magnetic field dependent parameter changes in the sensing coil. The control circuit is characterized by including an oscillator with an LC resonance circuit of which the inductance is formed by the sensing coil. The circuit includes a modulator for modulating the oscillation of the oscillator in response to the induction changes brought about in the sensing coil. The control signals for the switches are derived from the modulated oscillator oscillation because the oscillator frequency is considerably higher than the rotor speed. The sensing coil is in fixed relation to the stator but has no particular circumferential position relative thereto. A metallic element is attached to the rotor which turns with the rotor past the sensing coil. The position of the sensing coil and the metallic element at will independently of the stator coils. The metallic element may consist of soft iron and be attached to an end face of the rotor. The metallic element may have the shape of a segment and extend over an angle less than 180° so that with regard to the physical dimensions of the sensing coil, control signals displaced in phase through 180° are derivable from the signal of the sensing coil.

1 Claim, 11 Drawing Figures

CONTROL ARRANGEMENT FOR A BRUSHLESS MOTOR

The invention relates to a control arrangement for a brushless motor having a permanent magnet rotor and a stator winding, comprising a sensing coil to detect the rotary position of the rotor and a controllable electronic servo-element which is applied in series with the stator winding to the voltage source and which controls the flow through the stator winding depending on the rotary position of the rotor, a parameter change of the sensing coil caused by turning of the rotor being convertible to a control signal for the servo-element in that the oscillation at a higher frequency than the rotor speed of an oscillator having a feedback amplifier and an LC oscillating circuit in the feedback and the inductivity of which is determined by the sensing coil can be switched on and off and the control signal can be derived from the modulated oscillator oscillation. In pending U.S. patent application Ser. No. 702,494 having the same assignee, a suggestion has already been made for such a control arrangement, wherein the magnetic field of the rotor influences the inductivity of the sensing coil to detect the rotary position of the rotor. To produce the control signal for the servo-element in the correct rotary position of the rotory, the sensing coil must be secured to the stator at a predetermined position. However, this position is often accessible with difficulty, the accommodation of the sensing coil being more complicated if the coil is bulky.

The invention is based on the problem to improve the control arrangement of the above kind so that one may have more freedom as far as the mounting and construction of the sensing coil is concerned.

According to the invention, this problem is solved in that for the purpose of switching the oscillation of the oscillator on and off, the losses of the LC oscillating circuit can be influenced by a metallic element which turns with the rotor past the sensing coil.

With this arrangement, the oscillating condition of the oscillator is for the most part independent of any induction caused in the sensing coil by the rotor field. The position of the metallic element and the sensing coil can therefore be selected substantially at will and particularly so that it is an optimum from a spatial and electric point of view, for example substantially independent of external fields. The core of the sensing coil need not be saturatable or premagnetised. The construction of the coil can be just as simple. Nevertheless, the switching sensitivity of the oscillator remains comparatively high.

Preferably, it is ensured that the metallic element consists of soft iron. Soft iron has a comparatively high specific ohmic resistance and correspondingly higher losses than, for example, copper or aluminum.

It is particularly favourable if the metallic element is secured to an end face of the rotor that is transverse to the rotor shaft. The end face is particularly easily accessible and permits the application of a holder for the sensing coil between the winding heads of the stator where the space between them is usually empty.

The metallic element should extend electrically over an angle of rotation of the rotor that is so much less than 180° that, having regard to the finite dimensions of the sensing coil, control signals displaced in phase through 180° are derivable from the signal of the sensing coil.

In this case a plurality of loss-producing metallic elements can be uniformly distributed over a circle, their number being equal to the number of pairs of rotor or stator poles. This gives a uniform and high torque.

These metallic elements can be particularly simply formed as the teeth of a serrated disc.

Next, when using a single pair of motor poles, the metallic element can be in the form of a flat annular segment which spatially extends through almost 180° and the width of which is substantially equal to the diameter of the sensing coil. In this way one can achieve maximum influencing of the sensing coil over half a turn of the rotor whilst during the next half rotation the influence disappears so that the oscillator and thus one or two servo-elements as well as a corresponding number of stator windings can be switched on and off during one complete turn of the rotor.

Preferably, it is ensured that the mean length L and mean radius R of the annular segment as well as the diameter D of the sensing coil comply with the condition $R \cdot \pi > L > R \cdot \pi - D$. This dimensioning permits the switching shaft of the oscillator to be so placed that the switching operation is always accurately initiated after half a turn of the rotor even though the sensing coil has a finite diameter.

To avoid the imbalance of the rotor caused by the metallic element, a compensating weight can be secured to the rotor displaced 180° in the direction of rotor rotation from the position of the metallic element.

The sensing coil may comprise an open pot core having its mouth facing the metallic element. The pot core screens the winding of the sensing coil at all sides other than the open side facing the metallic element and it can also be readily mechanically secured.

Thus, the pot core may be soldered to a printed circuit panel by metal pins passing through the panel. This type of attachment is particularly simple and durable.

In addition, a retaining plate may be secured between the pot core and the panel. This is simultaneously held by the metal pins between the pot core and the circuit panel and can be secured to the stator in a simple manner.

Further, it can be ensured that the rotor shaft which is mounted at one side in relation to the rotor comprises an eccentric for driving a reciprocating piston compressor of a refrigerator and the centres of gravity of the eccentric and the metallic element are disposed on one side of the rotor shaft axis and the centre of gravity of a compensating weight on the other side, and the bearing of the rotor shaft is disposed between the compensating weight and the metallic element. In this way the torques of the pairs of centrifugal forces of the eccentric masses act in opposition to one another so that the frictional bearing forces are reduced.

The drawing illustrates preferred examples diagrammatically. In the drawing:

FIG. 1 illustrates the electrical portion of a control arrangement for a brushless D.C. motor;
FIG. 2 shows one end of the rotor of the motor;
FIG. 3 is an axial section through the rotor;
FIG. 4 shows the other end of the rotor;
FIG. 5 shows the underside of a holder for a sensing coil;
FIG. 6 is a side elevation of the FIG. 5 holder with the sensing coil secured thereon;
FIG. 7 is a plan view of the FIG. 6 holder with sensing coil;
FIG. 8 is a part-sectional detail on the line A—A in FIG. 7;

Figure 1:
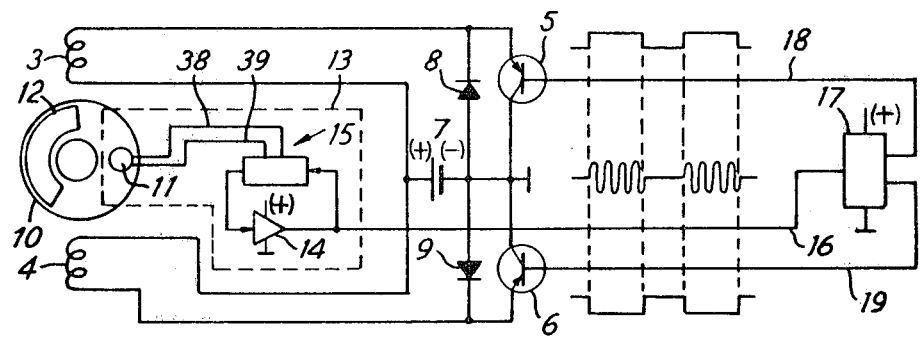
Figure 2:
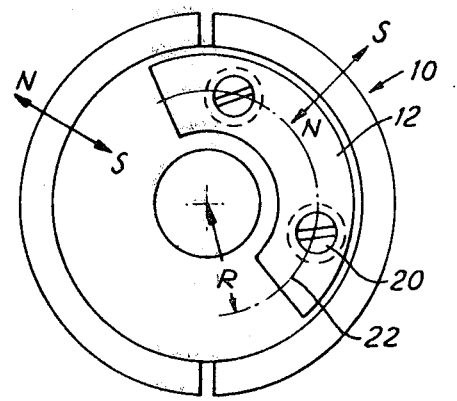
Figure 4:
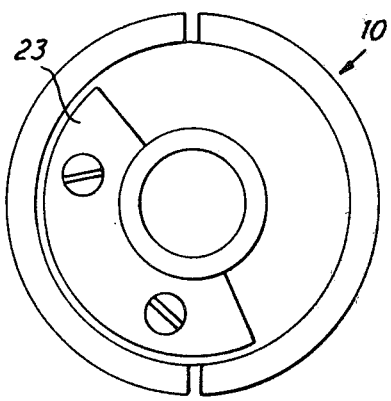
Figure 3:
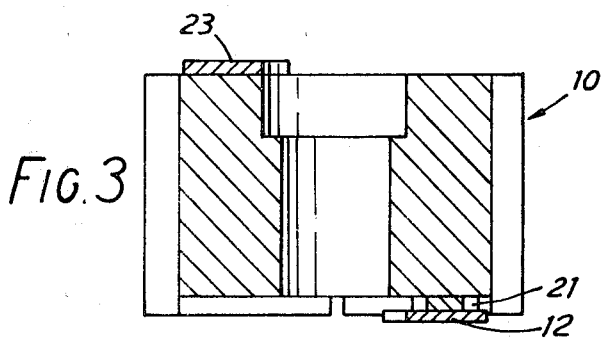
Figure 6:
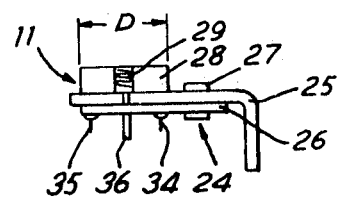
Figure 9:
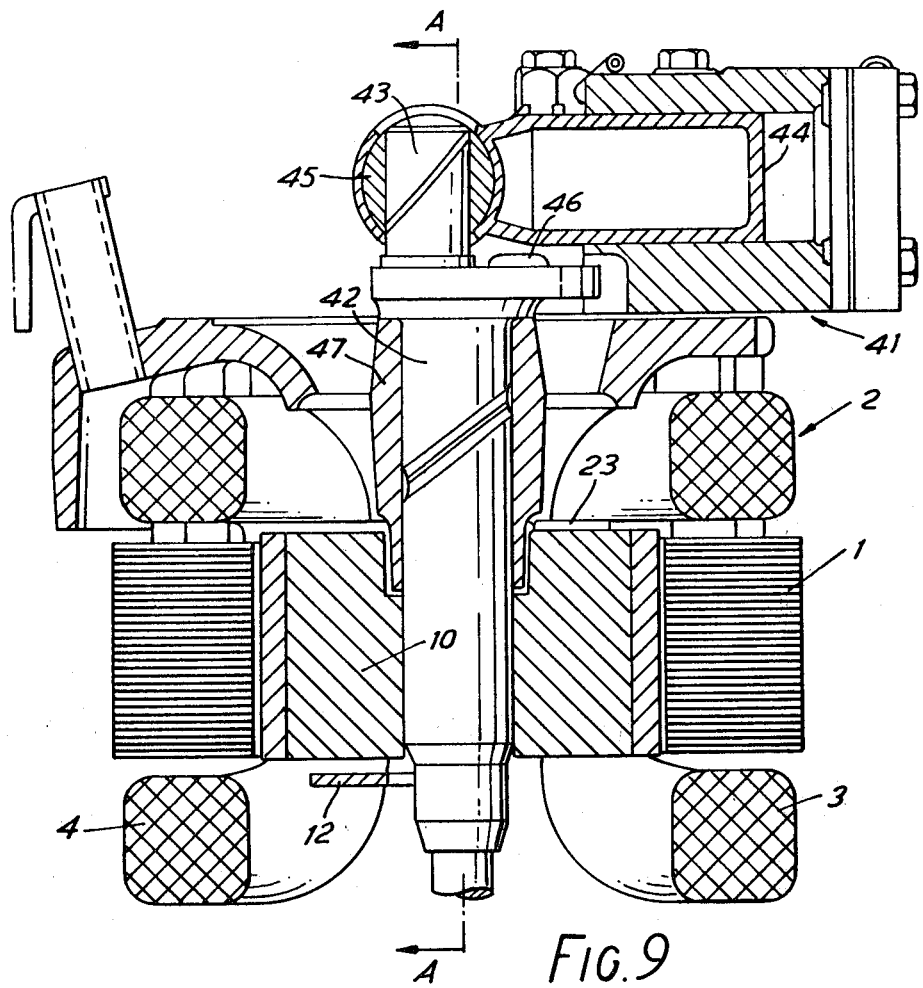
FIG. 9 is a part-sectional elevation of the motor of a refrigerator and the compressor driven thereby.

According to FIG. 1, the stator 1 (FIG. 9) of a brushless D.C. motor 2 (FIG. 9) is provided with two windings 3 and 4 which are spatially displaced through 180°. Each winding 3, 4 is applied to a D.C. source 7 in series with a controllable electric servo-element 5, 6 in the form of a power transistor operated as a switch. In anti-parallel with each servo-element 5, 6 there is a free-wheeling diode 8, 9. The rotary position of the rotor 10 in the form of a permanent magnet is detected by a sensing coil 11 disposed in front of one end face of the rotor 10 whereas a metallic element 12 in the form of an annular segment of soft iron is secured to the same end face of the rotor to turn past the sensing coil 11. The sensing coil 11 forms the inductivity of an LC oscillating circuit in an oscillator 13. The oscillator 13 consists of a feedback amplifier 14, in the feedback 15 of which there is disposed the LC oscillating circuit. As the metallic element 12 moves past the sensing coil 11, the ohmic losses of the sensing coil 11 and thus of the LC oscillating circuit rise. The amplification of the amplifier 14 and the transmission behaviour of the feedback are so adapted to one another that, by reason of the increased losses of the LC oscillating circuit, the oscillating condition of the oscillator 13 is no longer fulfilled, only without these additional losses. The oscillations of the oscillator 13 therefore disappear every time the metallic element 12 passes the sensing coil 11, as will be evident from the diagram of the time-course of the output signal of the oscillator 13 that is shown above the output line 16 of the oscillator 13. The length of the metallic element 12, the diameter of the sensing coil 11 and the switching shaft of the oscillator 13 are selected so that the oscillator oscillations alternately occur and disappear after each half rotation of the rotor 10. The oscillator output signal is demodulated in a control unit 17 and converted to two control signals displaced in phase through 180° in output lines 18 and 19 and fed to the bases of the transistors 5 and 6 respectively. The transistors 5 and 6 are therefore alternately conductive and blocked during 180° of rotor rotation and half a rotor turn, respectively. Accordingly, the stator windings 3 and 4 are alternately traversed by a current so that they alternately form a stator pole. By asymmetrically distributing the induction in the air gap between the stator 1 and rotor 10, one ensures that the rotor assumes a predetermined rest position at which it starts automatically. According to FIGS. 2 to 4, the metallic element 12 is secured to one end of the rotor 10 by means of two screws 20 and washers 21. The mean length L of the annular segmental metallic element 12 as measured on the arc 22 having the mean radius R is selected so that $$R \cdot \pi > L > R \cdot \pi - D$$

wherein D is the diameter of the sensing coil 11 (FIG. 6). The diameter of the sensing coil 11 is selected to be substantially equal to the width of the metallic element 12 (FIG. 9). As shown particularly in FIGS. 3 and 4, a compensating weight 23 is secured to the other end of the rotor 10 in the same way as the metallic element 12, namely so that the centres of gravity of the compensating weight 23 and metallic element 12 lie in the same axial rotor plane but on both sides of the axis of rotation of the rotor. In this way any imbalance of the rotor 10 caused by the metallic element 12 and its securing means is balanced out. The compensating weight 23 and the metallic element 12 have the same shape and are equally spaced from the rotor axis.

Figure 5:
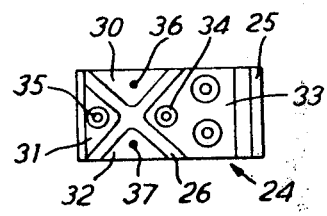
Figure 7:
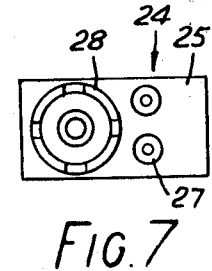

As shown particularly by FIGS. 5 to 7, the sensing coil 11 is secured to a holder 24 which consists of a flanged holding plate 25 and a circuit panel 26 connected by a hollow rivet 27. The sensing coil 11 comprises a pot core 28 in which the winding 29 of the sensing coil 11 is accommodated. The circuit panel 26 is laminated at four areas 30, 31, 32 and 33 on its underside. Metal pins 34 and 35 formed at the underside of the pot core 28 pass through the retaining plate 25 and the circuit panel 26 and are soldered on at the areas 31 and 33 to secure the sensing coil 11 to the holder 24. Two further metal pins 36 and 37 are soldered on at the one side to the ends of the winding 29 end at the other side in the areas 30 and 32. The metal pins 36 and 37 serve for the connection of connecting lines 38, 39 (FIGS. 1 and 9).

Figure 8:
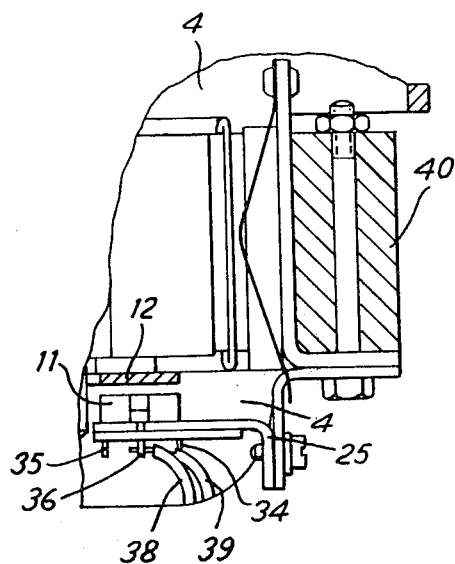

As shown in FIG. 8, in the gap between the winding heads of the stator coils 3 and 4, the sensing coil 11 is connected by means of the holding plate 25 to a part 40 which is fixed to the stator. The spacing or air gap between the metal element 12 and the sensing coil 11 amounts to about 0.5 mm.

According to FIG. 9, the motor 2 is coupled to the compressor 41 of a refrigerator so as to drive same. For this purpose, the rotor shaft 42 is provided with an eccentric 43 in the form of a crank pin rotatably mounted in a slide block 45 which is displaceably mounted in a cylindrical recess at the end of the compressor piston 44 transversely to the longitudinal axis of the compressor piston 44. To compensate the imbalance caused by the eccentric 43, a compensating weight 46 is provided on the shaft 42. The centres of gravity of the compensating weights 23, 46 as well as that of the eccentric 43 and the metallic element 12 all lie in the same plane but the compensating weights 23, 46 are on one side of the rotary axis of the rotor and the eccentric 43 and the metal element 12 on the other side. In this way the torques exerted by the pairs of centrifugal forces of the eccentric 43 and compensating weight 46 on the one hand and the metallic element 12 and compensating weight 23 can be compensated about an axis normal to the said plane of the centres of gravity, so that the bearing friction is reduced to a minimum in the single bearing 47 between the motor 2 and compressor 41 receiving the rotor shaft 42. The same effect can be achieved if the compensating weight 23 is omitted and the compensating weight 46 is correspondingly differently dimensioned so that it alone balances out an imbalance caused by the eccentric 43 and the metallic element 12. Incorporating the compensating weight 23 on the other hand permits the dimensions to be maintained for the already mass produced rotor shafts 42 and, if desired, permits the choice of a different position for the metallic element 12 in relation to the centres of gravity of the eccentric and compensating weight 46.

It might be mentioned that the unit consisting of the motor 2 and compressor 41 is usually so arranged in a hermetically sealed capsule that the compressor 41 is disposed at the top and the motor 2 at the bottom and the rotor shaft 42 dips with its lower end into an oil sump in the capsule to convey the oil to the bearing faces through an axially parallel bore in the shaft and helical peripheral grooves.

Figure 10:
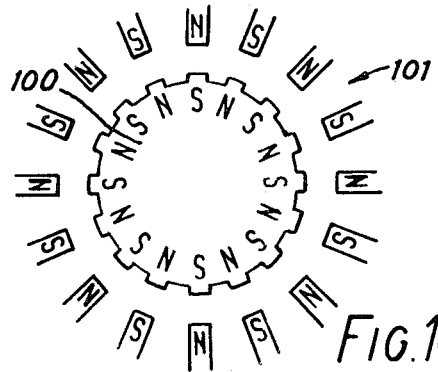
FIG. 10 shows a further embodiment of the motor.

In the FIG. 10 embodiment, the stator 101 possesses a plurality of stamped poles on which the two windings 3 and 4 (FIG. 1) are so wound that the adjacent poles have opposite polarities N and S. The one winding 3 may be associated with the north poles and the other 4 associated with the south poles. The rotor 100 may have the same number of stamped poles of alternating polarity.

Figure 11:
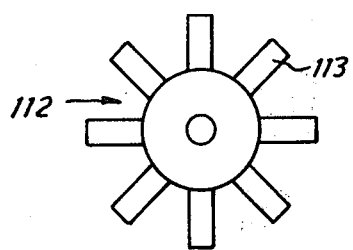
FIG. 11 shows a further embodiment of a metallic element.

The sensor arrangement then has a metallic element 112 of the kind shown in FIG. 11. It has the shape of a serrated annular disc in which the number of teeth 113 is equal to the number of pairs of poles of the stator 101 or the motor 100. The teeth are uniformly distributed at the periphery in the same way as the pairs of poles. The metallic elements 12 and 112 may be mounted in the same way. However, in the case of the metallic element 112 a compensating weight may be omitted.

The switching frequency of the transistors is higher in the embodiments of FIGS. 10 and 11 than in the embodiment of FIG. 1 if the speeds of the rotors 10 and 100 are equal.

Departures from the illustrated embodiments are possible within the scope of the invention. Thus, the metallic element 12, 112 may also be secured directly to the rotor shaft 42. Instead of the pot core one may use a rod core. The core material may be ferrite.

We claim:

1. A control arrangement for a brushless motor having a permanent magnet rotor and stator windings, comprising, a voltage source, a sensing coil in fixed relation to said stator for detecting the rotary position of said rotor, controllable electronic switches in respective series with said stator windings and said voltage source for controlling the current flow through said stator windings depending on the rotary position of said rotor, an oscillator for controlling said switches having a feedback amplifier and a feedback with an LC oscillating circuit which includes said sensing coil, a metallic element having the shape of annular segment attached to said rotor which cyclically sweeps past said sensing coil to alter the inductivity thereof to alternately switch said oscillator on and off, said metallic element being secured to an end face of said rotor transverse to the axis thereof; said metallic element extending electrically over an angle of rotation of the rotor of 180° and physically less than 180° having regard to the finite dimensions of said sensing coil, said element having a width substantially equal to the diameter of said sensing coil, said element being positioned so that control signals displaced in phase through 180° are derivable from the signal of said sensing coil, the mean length L and mean radius R of said segment as well as the diameter D of said sensing coil meeting the condition $R \times \pi > L > (R \times \pi) - D$.

* * * * *